United States Patent [19]
Dwork et al.

[11] Patent Number: 5,727,210
[45] Date of Patent: Mar. 10, 1998

[54] FAULT TOLERANT LOAD MANAGEMENT SYSTEM AND METHOD

[75] Inventors: Cynthia Dwork, Palo Alto; Joseph Y. Halpern, Cupertino; Hovey R. Strong, Jr., San Jose, all of Calif.

[73] Assignee: International Business Machines Corporation, Armonk, N.Y.

[21] Appl. No.: 507,745

[22] Filed: Jul. 26, 1995

Related U.S. Application Data

[63] Continuation of Ser. No. 375,044, Jan. 17, 1995, abandoned, which is a continuation of Ser. No. 993,183, Dec. 18, 1992, Pat. No. 5,513,354.

[51] Int. Cl.$^6$ .................................................. G06F 11/20
[52] U.S. Cl. ................................... 395/674; 395/182.08
[58] Field of Search ............................. 395/650, 182.08, 395/182.09, 674

[56] References Cited

U.S. PATENT DOCUMENTS

| | | | |
|---|---|---|---|
| 4,126,895 | 11/1978 | Weemaes et al. | 364/DIG. 1 |
| 4,318,173 | 3/1982 | Freedman | 364/DIG. 1 |
| 4,323,966 | 4/1982 | Whiteside et al. | 385/182.09 X |
| 4,333,144 | 6/1982 | Whiteside et al. | 364/DIG. 1 |
| 4,356,546 | 10/1982 | Whiteside et al. | 364/DIG. 1 |
| 4,710,926 | 12/1987 | Brown et al. | 371/9 |
| 4,805,107 | 2/1989 | Kieckhafer et al. | 364/DIG. 1 |
| 4,817,091 | 3/1989 | Katzman et al. | 371/9 |
| 4,852,001 | 7/1989 | Tsushima et al. | 364/401 |
| 4,958,273 | 9/1990 | Anderson et al. | 364/DIG. 1 |
| 5,012,409 | 4/1991 | Fletcher et al. | 364/DIG. 1 |

OTHER PUBLICATIONS

D. Dolev et al., Early Stopping in Byzantine Agreement, Journal of Association for Computing Machinery, vol. 37, No. 4, pp. 720–741, Oct. 1990.

M. J. Fischer, The Consensus Problem in Unreliable Distributed Systems (A Brief Survey), presented at International Conf. on Foundations of Comutation Theory, Borgholm Sweden, pp. 127–140, Aug. 21–27, 1983.

*Primary Examiner*—Thomas M. Heckler
*Attorney, Agent, or Firm*—James C. Pintner

[57] ABSTRACT

A method and apparatus are disclosed for managing tasks in a network of processors. After a period of time has elapsed, during which the processors of the network have been executing tasks allocated to them, the processors exchange views as to which pending tasks have or have not been completed. The processors reach a consensus as to the overall state of completion of the pending tasks. In a preferred embodiment, the processors exchange views and update their views based on the views received from the other processors. A predetermined condition determines that a consensus has been reached. The predetermined condition is preferably two sets of exchanges in which a processor has received messages from the same set of other processors. Alternatively, the condition is an exchange which does not result in any updates to a processor's view. A processor which has not sent a view as part of an exchange is deemed to have crashed, and the tasks previously allocated to crashed processors are assumed not to have been completed. All pending tasks including those previously allocated but not completed, are then allocated. Preferably, allocation is based on an estimation that approximately the same time will be required for each processor to complete its allocated tasks. Based on this estimation, a time is scheduled for the next exchange of views, and the processors then resume executing their allocated tasks.

22 Claims, 3 Drawing Sheets

FAULT TOLERANT LOAD MANAGEMENT SYSTEM AND METHOD

This is a continuation of application Ser. No. 08/375,044 filed on Jan. 17, 1995 abandoned, which is a continuation of Ser. No. 07/993,183 filed on Dec. 18, 1992, now U.S. Pat. No. 5,513,354.

FIELD OF THE INVENTION

The present invention generally relates to the field of multiprocessing. More specifically, the invention relates to a method for allocating tasks among a plurality of processors subject to failure.

BACKGROUND OF THE INVENTION

In processing system applications, work load management is an important consideration. That is, it is important to keep track of what tasks there are to be completed, and to allocate the work based on the available processing resources to facilitate completion of the tasks. It has been found that employing some form of redundant processing capability is necessary or desirable in order to continue processing in the face of equipment failure. For instance, a processing system might include two or more autonomous processors, and some sort of means for allocating the available tasks to the processors. Thus, if one of the processors fails, the other processor is still available to complete the pending tasks, and the work can be allocated to it.

In such a multiprocessing system, there arises the question of how to utilize the processing resources most efficiently, while still ensuring that all of the tasks are completed. One possible strategy is to have each of the processors separately execute each of the pending tasks. This strategy is feasible as long as the tasks are of such a nature that they can be executed more than once, or suspended and resumed, without harm. Tasks which can be executed more than once without harm are called "idempotent", and include, for instance, verifying a step in a formal proof, evaluating a Boolean formula at a particular assignment of the variables, opening a valve, sending a message to a large group of processes, or reading records in a distributed database.

A strategy of having each processor execute all of the tasks ensures that the tasks will all be completed, as long as any of the processors are functioning. However, such a strategy utilizes the processing capability inefficiently. Most of the time most of the processors will be operational, but no more tasks are completed than would be the case if a single processor were executing all of the tasks. In addition, each one of the processors must each be powerful enough to execute all of the tasks by itself. As a result, the processors either must have greater processing power or require a greater amount of processing time than if they only had to execute a subset of the tasks. Thus, costs related to equipment or processing time are disadvantageously increased.

Another strategy for utilizing multiple processors to execute tasks involves allocating tasks among the processors, so that different processors execute different tasks. A controller is also provided for managing the workload, allocating the tasks among the processors, and identifying faulty processors. However, this strategy has the disadvantage that a failure of the controller brings the whole system to a halt, even though all of the processors might still be operational. Redundant controllers may be provided, but doing so disadvantageously adds to the cost of the system.

Three United States Patents, commonly assigned to Bendix Corp., disclose aspects of a system which attempts to improve on the above-described conventional approaches to multi-processor task management. These three patents are U.S. Pat. No. 4,318,173, issued to Freedman et al., and titled "Scheduler for a Multiple Computer System", U.S. Pat. No. 4,323,966, issued to Whiteside et al., and titled "Operations Controller for a Fault-Tolerant Multiple Computer System", and U.S. Pat. No. 4,333,144, issued to Whiteside et al., and titled "Task Communicator for Multiple Computer System". In this system, different tasks are allocated to different processors, and the processors exchange messages. The '966 patent discloses a controller which is associated with one of the processors (each processor has such a controller). The controller manages the operation of the associated processor, and communicates with the other controllers associated with the other processors. The controller includes a task communicator, which is the subject of the '144 patent, and which assembles input data required for the execution of tasks allocated to the associated processor, makes the input data available thereto, and sends the other controllers the results of completed tasks, so that the other controllers may make the results available, as necessary, as input data for other tasks allocated to the other processors.

The controller further includes a scheduler, which is the subject of the '173 patent, and which selects which tasks, not selected by other processors, are to be executed by its associated processor, and schedules the selected tasks for execution. Tasks are executed on a data driven basis. That is, if a given task requires the results of one or more other tasks as inputs, then the given task is selected for execution only after all of the necessary inputs have been received from the other processors which executed the other tasks which produced the required inputs. Each task is assigned to at least two of the processors, although assigned tasks are selected for execution individually. Thus, a task which was executed by a first processor and whose results have been transmitted, may not be executed by a second processor to which it is assigned, as a result of the execution by the first processor. Also, the selection of a task for execution by one processor is communicated to the other processors, and the selection deters another processor to which the task was assigned from also selecting it.

Finally, the controller includes a fault handler, which identifies other processors as being faulty based on messages received therefrom, sends the messages from non-faulty processors to the scheduler, and sends the other controllers messages indicating which other processors it has identified as being faulty. Faults are detected by techniques such as comparing the results of an executed task with known range limits, comparing the results of the same task executed by two or more processors, using error detection codes, analyzing the scheduling sequence, or using watchdog timers. If it has been determined that a processor is faulty, such as by fault detection messages from two or more other processors, then the results of the faulty processor are discarded or ignored. However, the subsequent messages from the processor are monitored, and if the processor appears to have returned to normal operation, the processor is restored to full participation in the system.

It will thus be seen that the multiple-processor system described in the Bendix patents improve the efficiency of processor utilization by allocating different tasks to different processors, while allowing for processor failure. However, several disadvantages remain. First, since each task is allocated to at least two processors, there is inefficiency relating to throughput and overhead in scheduling and selecting each task. Moreover, if a task is assigned to several processors, they all may execute the task, thus utilizing processing resources inefficiently. The Bendix system does not provide load balancing or accommodate dynamic input of new pending tasks.

Also, the fault detection system is based on the receipt and identification of erroneous messages from a faulty processor. A crash failure, in which a processor ceases processing and sending messages altogether, is not efficiently detected, and the pending tasks assigned to the crashed processor are not efficiently reallocated. Also, the system does not tolerate multiple processor failures. If a pending task is assigned to a subset of the processors, then the task is not executed if all of the subset of processors fail, even though other processors might have available processing time.

Therefore, there remains a need for a multi-processing system which further improves the efficiency of processor utilization, which identifies crash failures and reallocates pending tasks efficiently, and which is sufficiently fault tolerant to guarantee that a pending task will be executed as long as one or more processors remain operational.

SUMMARY OF THE INVENTION

In order to overcome the drawbacks of the prior art discussed above, there is provided in accordance with the invention a method for managing work allocation over a plurality of processors, such as a network. The method avoids the inefficiency of having different processors execute the same tasks redundantly, while avoiding the risk that a failure of a manager disrupts or halts all processing. Therefore, it provides advantageous efficiency and reliability.

The method includes the steps of exchanging views between the processors to reach a consensus as to which pending tasks have or have not been completed. The pending tasks are then allocated among the processors, and the processors commence executing the tasks allocated to them.

The process of exchanging views to reach a consensus is preferably done by means of Eventual Byzantine Agreement, which is described in Dolev et al., "Early Stopping in Byzantine Agreement", Journal of the Association for Computing Machinery, Vol. 37, No. 4, October 1990, pp. 720–41. A series of rounds take place in which each processor transmits its own view as to what work has or has not been done. For the first round, each processor transmits a message reporting on its own work. After receiving the first round of messages, each processor integrates the messages it received into an overall view of what work has been done by all of the processors. Due to processor crashes or communication mishaps, different processors may have different views. In subsequent rounds, the processors transmit their views, and update their views in accordance with the views of other processors. Byzantine Agreement takes place when a consensus is established, as per a predetermined criterion.

In a preferred embodiment of the invention, the consensus is reached when, in two consecutive rounds, a processor receives messages from the same set of other processors. Assuming that connectivity is sufficient for each operational processor to be able to send messages to and receive messages from each of the other operational processors, these two rounds are sufficient to establish agreement. In another preferred embodiment of the invention, Eventual Byzantine Agreement has been reached when, for two rounds, a processor's view remains unchanged. The second preferred embodiment generally requires more processing, and sometimes more time, than the first preferred embodiment, but either may be practiced in accordance with the spirit and scope of the invention.

The number of rounds required for Eventual Byzantine Agreement vary, depending on the number of failed processors or communication problems. Eventual Byzantine Agreement is also made as to which processors are currently operational. A processor which has not sent its views, or which ceased sending views before Eventual Byzantine Agreement has been reached, is deemed to have crashed. In accordance with the invention, it is assumed that the work allocated to a processor which was operational at the previous Byzantine Agreement, but which has since crashed, has not been completed. Also, the operational processors have made known which of the tasks previously assigned to them have not been completed. Thus, after Eventual Byzantine Agreement is reached, the operational processors know what tasks have not been completed.

The tasks to be completed are reallocated to the operational processors. A future time is scheduled for another execution of the above method. For efficiency, the scheduled time is far enough in the future that the operational processors will have had enough time to execute substantially all of the work allocated to them. However, the scheduled time should not be so far in the future that the processors complete all of their allocated tasks and enter an idle state. In accordance with the invention, each task has associated with it an estimate, not necessarily accurate, of the length of time required for execution. The tasks are reallocated such that each operational processor will require approximately the same amount of time to complete its allocated tasks. The scheduled time is set based on this time.

A method and apparatus in accordance with the invention utilize processing resources with advantageous efficiency. A given task is allocated to only one processor at a time, so that, normally, few or no tasks are redundantly executed. Also, the times for reaching Eventual Byzantine Agreement are spaced out so that the processors do not expend an unnecessarily large amount of overhead interrupting tasks in mid-execution to perform the method of the invention.

At the same time, the method and apparatus of the invention provide advantageous reliability. As long as any one of the processors remains operational, tasks are executed. However, there is no extra expense for redundant equipment, except for the processors themselves.

DESCRIPTION OF THE PREFERRED EMBODIMENTS

The invention will be primarily described in terms of a method for managing tasks, i.e., a method for operating a multi-processing system. However, persons skilled in the art will recognize that a process controller, which includes suitable programming means for operating in accordance with the method to be disclosed, also falls within the spirit and scope of the invention. In addition, the invention may also be embodied in a computer program product, i.e., a recording medium such as a diskette. Such a product may be intended, manufactured, and/or sold for use with a suitable processing system. Program means for directing the processing system, with which the product is to be used, to execute the steps of the method of the invention, is written on the recording medium in a form readable by the processing system.

Figure 1:
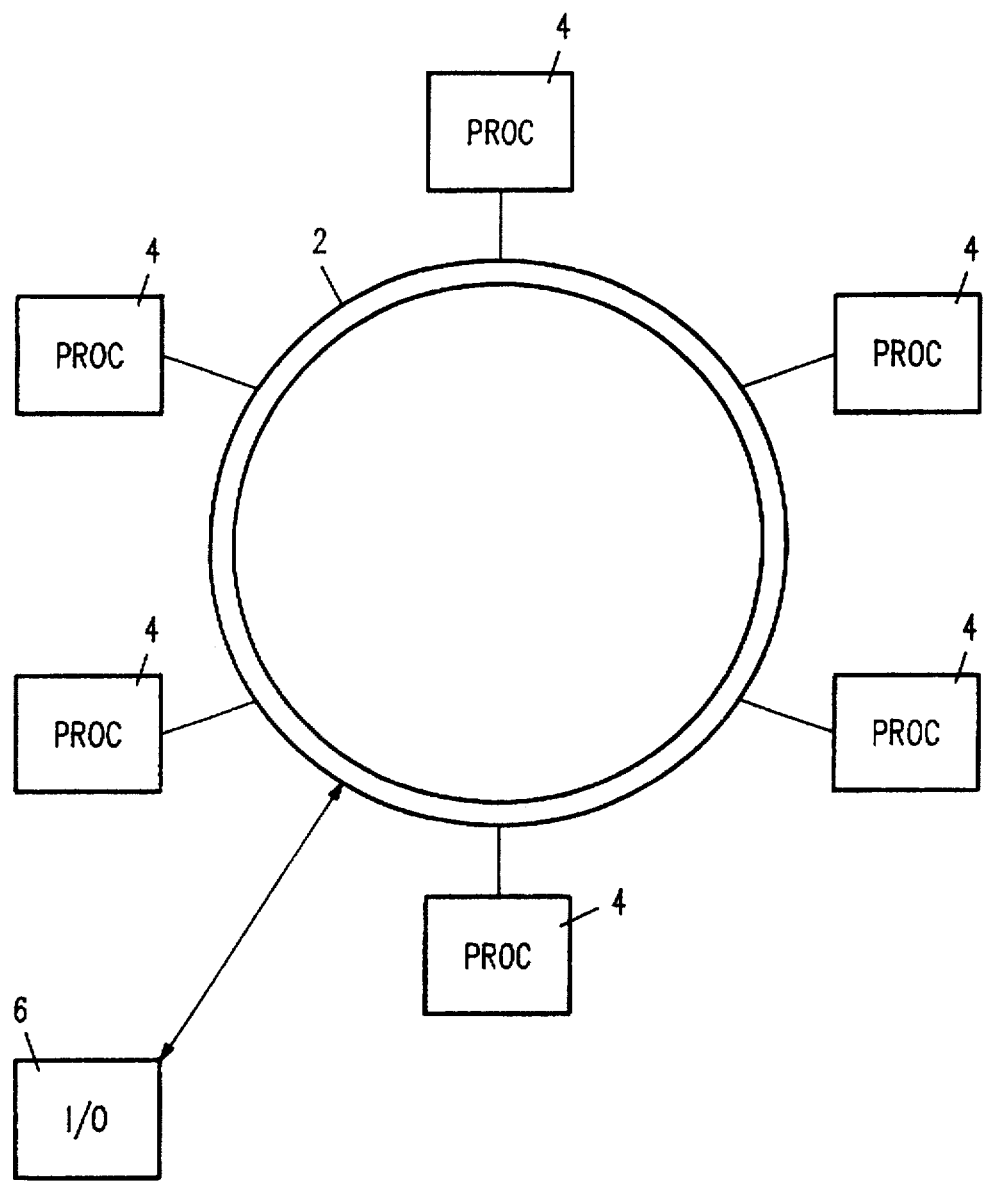
FIG. 1 is a system block diagram of a processing network including a plurality of processors for executing the method of the invention.

FIG. 1 is a system block diagram of a processing network with which the method of the invention is to be practiced. The network of FIG. 1 is shown in simplified, schematic form. In FIG. 1, a communication medium 2 is shown, having a plurality of processors 4 coupled thereto for communication. An Input/Output unit 6 schematically represents any suitable apparatus for communicating with the network to provide tasks to be executed and receives results of tasks which have been executed.

It will be understood that various configurations of multi-processing networks which would be known to a person of ordinary skill in the art may be used for practicing the method of the invention. Such networks include broadcast networks, such as token ring networks or Ethernets, and point-to-point networks. A network on which the method of the invention is to be practiced should have sufficient connectivity that, regardless of other failures, any two operational processors can communicate, even if messages between the two processors pass through one or more intermediate network nodes. Broadcast networks have such connectivity. Point-to-point networks which provide adequate rerouting options for communicating between nodes also have sufficient connectivity for practicing the invention.

It is assumed that any one of the processors 4 may suffer a crash failure at any time. When a processor suffers a crash failure, it will not transmit any messages subsequently, until such time, if any, that is restored to functionality. It may be that at the time the processor 4 crashes, it is currently sending a message to a plurality of intended recipients. It is possible, then, that the message may only reach a subset of the intended recipients.

Also, it is assumed that work is generated by either the processors 4 themselves, or by an external source and provided through the I/O unit 6 to the network. It is also possible that a fault relating to the generation of work may cause a broadcast of a pending task to reach only a subset of the processors 4.

It is further assumed that each task has with it an estimate of how long it will take to perform, or that it is possible to make a determination as to the estimated length of time required for performing the task. For the purpose of the invention, it is not essential that the estimate be correct.

Also, it is assumed that the work is idempotent, i.e., that a given task may be executed more than once, simultaneously, or at two different times, without harm. Also, it is assumed that a task can be suspended and resumed without harm.

Figure 2:
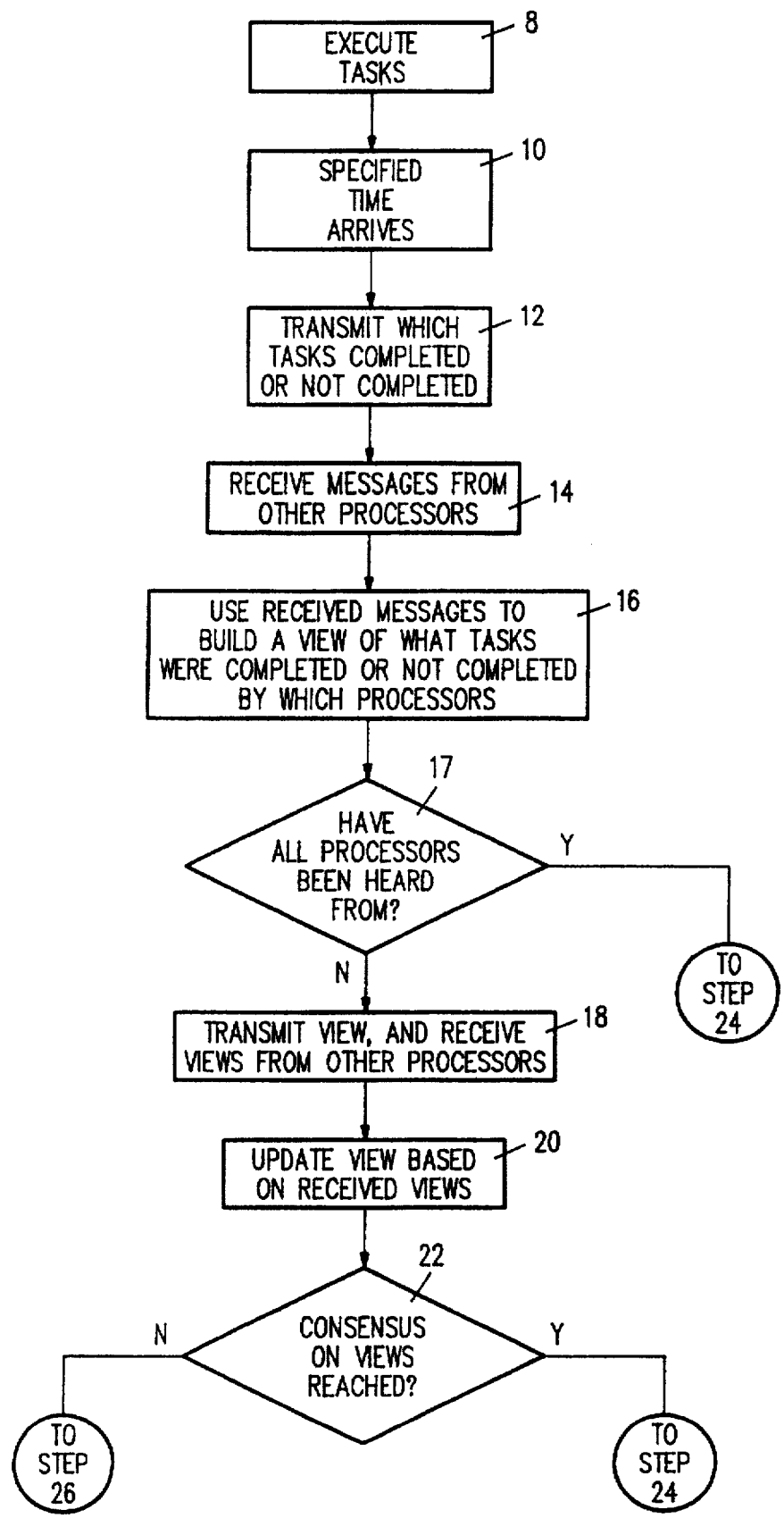
FIGS. 2 and 3 together make up a flowchart of the method of the invention.
Figure 3:
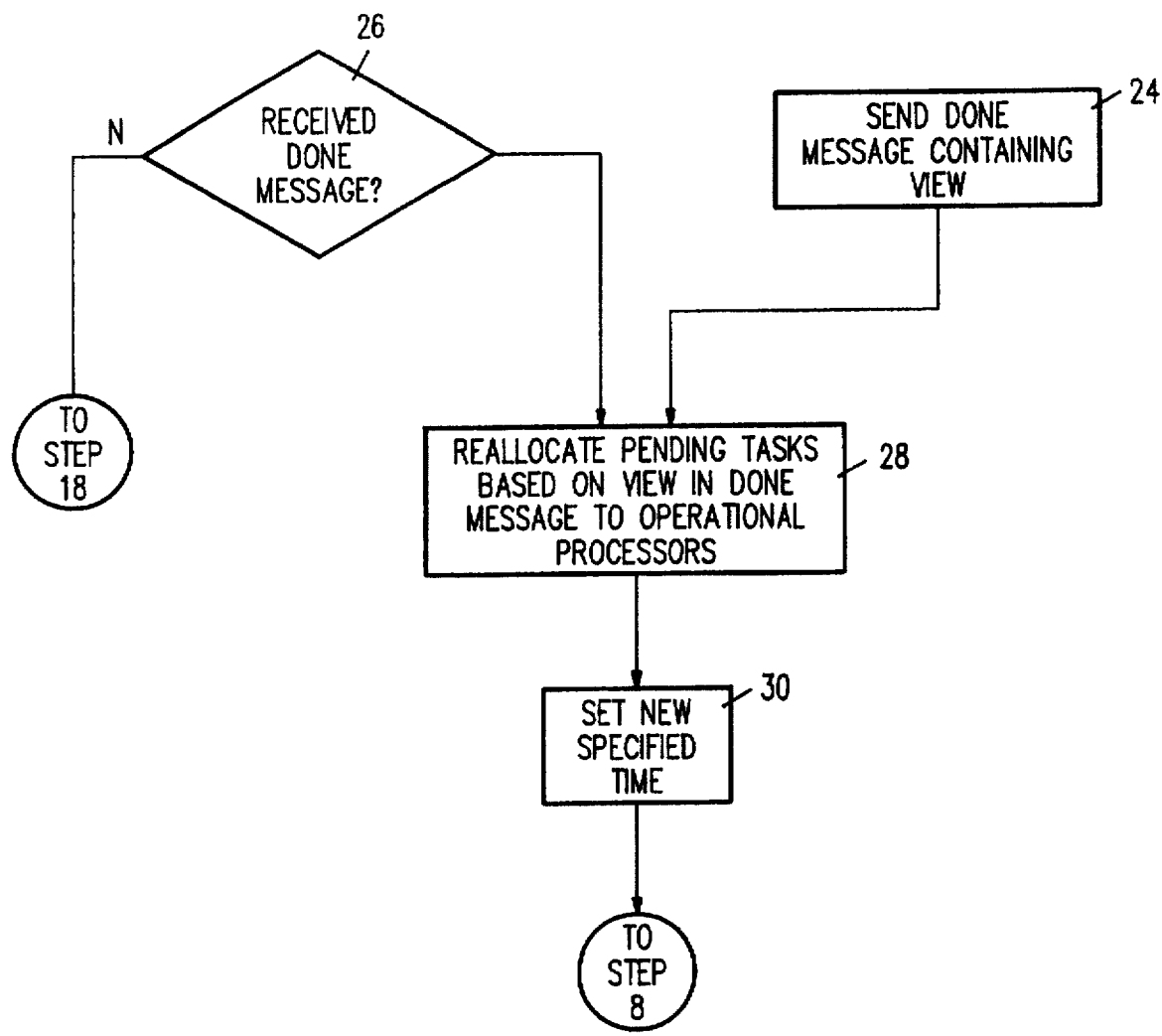

Given these conditions, a preferred embodiment of the method of the invention is practiced as per the flow chart of FIGS. 2 and 3. The method of the invention involves periodically agreeing on the work that needs to be done, including tasks that were suppose to be done by processors that have crashed. Given this agreement, then the tasks are balanced among the processors that are currently operational. This is done on a periodic basis. In between occurrences of the method of the invention, the processors execute the tasks allocated to them. There is overhead involved in this agreement, so that the time for the next agreement should be chosen in such a way as to allow enough time for most of the tasks to be completed, or be close to completion, while not allowing too much time, since the processors 4 may complete their tasks and have idle time.

The preferred method of the invention operates as follows. In step 8, each processor 4 is engaged in executing tasks allocated to it. In step 10, the specified time for the agreement and reallocation arrives.

In step 12, each processor broadcasts a message stating which tasks it has completed, or which tasks allocated to it still need to be done. This includes any tasks assigned to the processor 4 but which were not completed, as well as what ever new tasks have become pending since the last agreement. Each processor 4 has identity information regarding the other processors 4 in the network, and compares the messages received with the identities of the other processors. If a given processor does not receive a message from a given other one of the processors, then it assumes that the other processor has crashed and that the work assigned to that processor at the time of the last agreement has not been done, and has to be included in the work that is about to be allocated among the functional processors. A given processor may also discover that it was not previously informed about tasks about which other processors were informed.

The exchange of messages described above constitutes a first round. Following the first round, each processor executes step 16, to build a view of what tasks were completed or not completed by which of the other processors 4 in the network.

At this point, a test is made in step 17. Normally, if there have been no processor failures, a processor executing the method of the invention will find that it has received a message from each of the operational processors. The processor maintains a record of all of the processors which were operational the last time the method of the invention was executed. It uses this record as a benchmark for determining whether it has heard from all operational processors. If it has, then the test of step 17 produces a "yes" result, and the processor moves to step 24, described below.

If the processor has not heard from all of the other processors which were operational the last time around, then one or more processor failures have occurred. Therefore, the remaining operational processors must identify which processors have failed, and reallocate the work which had been assigned to those failed processors. The remaining operational processors reach a consensus regarding which processors have failed, and what work is pending. In a preferred embodiment of the invention, this consensus is reached using Eventual Byzantine Agreement.

A next round begins with step 18. Each processor broadcasts its view, containing a description of the work which that processor thinks was performed in the last period, a description of the work that needs to be done, and a list of processors which have not been heard from since the last agreement. Upon receiving the views from the other processors 4, each processor 4 updates its own view accordingly. If a given processor does not receive the view of another processor which was supposed to have sent a view, this processor adds that other processor to the list of crashed processors. Therefore, based on the views received, in step 20, each processor 4 updates it own view.

The processors 4 then make a test, shown in step 22, as to whether a consensus on views has been reached between the processors. Preferably, a given processor determines that a consensus has been reached if, in two consecutive rounds, it hears from the same set of other processors. Alternatively, the consensus may be determined based on two consecutive rounds in which a processor's view does not change based on any of the views it receives. If a consensus is not reached, then the method returns to step 18 and another round of exchanges of views takes place.

Eventually, a consensus is reached. When one of the processors 4 detects that a consensus is reached in accordance with the criteria given above, the processor 4 sends a DONE message, containing that processor's view, in step 24.

In addition, in step 26, each processor 4 tests whether it has received a DONE message from any of the other processors 4. If not, the processor 4 returns to step 18 and another round is executed.

If one of the processors 4 has either sent or received a DONE message, then it moves to step 28, in which the pending tasks, as determined in the consensus, are reallocated among the processors based on the consensus view. That is, the tasks are reallocated among the according to the are operational according to the view of the processor which sent the DONE message. The exchange of DONE messages constitute a final round of exchanges of views, since the DONE messages include views. Also, any pending tasks which have entered the system since the last agreement are included in the reallocation. Thus, the method of the invention provides for advantageously convenient allocation of new tasks. Then a new specified time is set in step 30. The time is determined based on the estimates of the amount of time required for each of the tasks, and assumes that the tasks were allocated among the processors 4 on approximately an equal time bases. Thus, the time set in step 30 is such that the processors have time to complete most, if not all, of the tasks allocated to them before the specified time. However, the specified time is set small enough that, based on the estimates of the length of time required to execute the tasks, the processors will not have to consume idle time waiting for the next specified time after completing all of their tasks. The exact method for determining the specified time is not essential to the invention, as long as the above criteria are met.

Finally, each processor 4 returns to step 8, and resumes executing the tasks allocated to it.

If there are no processor failures during the time that the method of FIGS. 2 and 3 is being executed, then only two rounds are required for reaching the consensus. The first round includes the transmission of the work each processor itself has done (step 12). The second round is the transmission of the DONE message in step 24. It will be seen that, where no failures have occurred, each processor will find that the result of the test of step 22 is "yes", and each processor will execute step 24 and send a DONE message.

The number of rounds increases, and includes one or more executions of step 18, if any of the processors have failed. Specifically, if f is the total number of failures that occur while the method of FIGS. 2 and 3 is being run, then the method will run for at most f+2 rounds, including f executions of step 18. This number of rounds will be required if the failures occur between rounds. If, between any two consecutive rounds, no failures occur, then the consensus is reached following those two rounds. Thus, fewer than f+2 rounds may be required to reach the consensus.

If a network includes t number of processors, then the number of messages sent per round depends on the network configuration. In a broadcast network, at most t broadcasts are sent per round, one broadcast per non-faulty processor. In a point-to-point network, up to $t^2$ messages are sent per round, depending on the configuration and connectivity of the network. For a network of t processors with f failures, the maximum possible number of messages transmitted is bounded by the product of the maximum number of rounds and the maximum number of messages per round, as given above. The number of messages per round decreases in successive rounds as the number of operational processors decreases. A calculation of the total number of messages transmitted would take this decreasing number of operational processors into account.

From the foregoing, it will be seen that the overhead for the method of the invention is quite low in the typical case where there are no crash failures. Also, it is guaranteed that all of the tasks get done, since any task that is not known to have been done is added to the pool of tasks that need to be done. This occurs regardless of how few operational processors remain.

In order to guarantee a relatively low latency time for work, it can be ensured that older tasks are executed first. Similarly, if tasks come with relative priorities, the work allocation can be made so that higher priority tasks are executed first. Finally, if a processor 4 finishes early, rather than idling it can begin working on tasks which have been received since the last agreement. The processor 4 can also request additional work through the network if it has not already received any additional tasks. The processor 4 then includes this additional work in its report of work that has been completed at the time the next agreement is to be made. It is possible that two processors which are idling will choose to do the same task. This is likely to take place if either the estimates of the lengths of time required for completing the tasks are not correct, or if the total amount of pending work is small. This can be prevented using heuristics, but even if it happens there is no harm, since the tasks are idempotent.

The method of the invention is capable of dealing with new processors joining the network, or processors that have crashed and been restored to operability. The newly joined processor only needs to discover the time schedule for the next agreement.

In the preferred embodiment described above, the consensus is reached concurrently as to the tasks still pending from the previous Buzantine Agreement, and the operational processors. However, the method of the invention could be practiced to reach a consensus regarding either of these, absent the other. For instance, in one alternative embodiment the consensus is reached only with regard to the leftover pending tasks. Then, these tasks, along with any newly arrived tasks, are reallocated by load balancing as described above, and the next time for reaching an agreement is set. In another alternative embodiment, the consensus is reached with regard to the currently operational processors. Then, any pending tasks are allocated. This latter alternative embodiment of the invention is advantageously practiced, for instance, when a multiprocessing system is being started up, a body of pending work is present, but the processors had not previously been executing any tasks.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer program product, for use with a processor in a multiprocessing network including a plurality of processors, the computer program product comprising:

a recording medium;

means, recorded on the recording medium, for directing the processor to determine, along with other operational processors of the multiprocessing network, which tasks, previously allocated to various ones of the processors, have not been executed, the means for directing to determine including:

means, recorded on the recording medium, for directing the processor to exchange views between itself and the other operational processors to reach consensus among the operational processors as to the status of the previously allocated tasks, each view including at least one of: (a) information on what work has been done by the processor sending the view; and (b) information on what work, done by other processors, has been reported to the processor sending the view; and means, recorded on the recording medium, for directing the processor to allocate pending tasks between the processor and the other operational processors.

2. A computer program product as recited in claim 1, wherein the means for directing to allocate includes:

means, recorded on the recording medium, for directing the processor to estimate the length of time required to complete each of the pending tasks; and means, recorded on the recording medium, for directing the processor to allocate the tasks such that each of the processors will require approximately the same total time for completion of its allocated tasks.

3. A computer program product as recited in claim 1, wherein the means for directing to exchange includes means, recorded on the recording medium, for directing the processor to initially transmit a message stating what work the processor has executed.

4. A computer program product as recited in claim 3, wherein the means for directing to exchange includes means, recorded on the recording medium, for directing the processor to receive messages initially transmitted by the other operational processors of the network, and to incorporate the received messages into the processor's view as to what tasks have been executed.

5. A computer program product as recited in claim 1, further comprising means, recorded on the recording medium, for directing the processor to schedule a future time at which the means for exchanging and allocating are to operate again.

6. A computer program product as recited in claim 5, wherein:

the means for directing to allocate includes:

means, recorded on the recording medium, for directing the processor to estimate the length of time required to complete each of the pending tasks, and means, recorded on the recording medium, for directing the processor to allocate the tasks such that each of the processors will require approximately the same total time for completion of its allocated tasks; and the means for directing to schedule includes means, recorded on the recording medium, for directing the processor to select the future time based on the approximately same total time for completion of the allocated tasks by each of the processors.

7. A computer program product as recited in claim 1, wherein the means for directing to exchange includes means, recorded on the recording medium, for directing the processor to make exchanges, each exchange including transmitting the processor's view, to receive transmitted views from the other processors, and to update the processor's view based on the received views, until a predetermined condition indicative of a consensus has been reached.

8. A computer program product as recited in claim 7, wherein, in the means for directing to exchange, the predetermined condition is that, for two exchanges of views, the processor receives messages from the same set of other operational processors.

9. A computer program product as recited in claim 7, wherein, in the means for directing to exchange, the predetermined condition is that, for two exchanges of views, the processor's view does not change based on any views received.

10. A computer program product as recited in claim 7, further comprising:

means, recorded on the recording medium, for directing the processor, responsive to the predetermined condition being achieved, to transmit a message that the condition has been reached; and means, recorded on the recording medium, for directing the processor to terminate the step of exchanging responsive to transmission or receipt of a message that the condition has been reached.

11. A computer program product as recited in claim 1, wherein the means for directing to determine includes means, recorded on the recording medium, for directing the processor to determine, along with the other operational processors of the multiprocessing system, which of the plurality of processors have failed.

12. A computer program product as recited in claim 11, wherein the step of determining the failed processors includes determining that a processor which did not transmit a view as part of an exchange of views has failed.

13. A computer program product as recited in claim 12, wherein the means for directing to exchange includes means, recorded on the recording medium, for directing the processor to determine that tasks previously allocated to the processor which is determined to have failed have not been executed.

14. A computer program product as recited in claim 13, wherein the means for directing to allocate includes means, recorded on the recording medium, for directing the processor to allocate previously pending tasks which were allocated in a previous operation of the means for reaching and allocating, but which have not been executed, and to allocate tasks which became pending subsequent to the previous operation of the means for reaching and allocating.

15. A computer program product, for use with a processor in a multiprocessing network including a plurality of processors, the computer program product comprising:

a recording medium;

means, recorded on the recording medium, for directing the processor to determine, along with other operational processors of the multiprocessing network, which ones of the plurality of processors have failed, the means for directing to determine including:

means, recorded on the recording medium, for directing the processor to exchange views between itself and the other operational processors to reach consensus among the operational processors as to the operational status of the plurality of processors known to the operational processors, each view including at least one of: (a) information on what work has been done by the processor sending the view, and (b) information on what work, done by other processors, has been reported to the processor sending the view; and means, recorded on the recording medium, for directing the processor to allocate pending tasks between the processor and the other operational processors.

16. A computer program product as recited in claim 15, wherein the step of determining the failed processors includes determining that a processor which did not transmit a view as part of an exchange of views has failed.

17. A computer program product as recited in claim 15, wherein the means for directing to exchange includes means, recorded on the recording medium, for directing the processor to initially transmit a message reflecting the processor's operational status.

18. A computer program product as recited in claim 17, wherein the means for directing to exchange includes means, recorded on the recording medium, for directing the processor to receive messages initially transmitted by the other operational processors of the network, and to incorporate the received messages into the processor's view as to the operational status of the plurality of processors.

19. A computer program product as recited in claim 15, wherein the means for directing to exchange includes means, recorded on the recording medium, for directing the processor to make exchanges, each exchange including transmitting the processor's view, to receive transmitted views from the other processors, and to update the processor's view based on the received views, until a predetermined condition indicative of a consensus has been reached.

20. A computer program product as recited in claim 19, wherein, in the means for directing to exchange, the predetermined condition is that, for two exchanges of views, the processor receives messages from the same set of other operational processors.

21. A computer program product as recited in claim 19, wherein, in the means for directing to exchange, the predetermined condition is that, for two exchanges of views, the processor's view does not change based on any views received.

22. A computer program product as recited in claim 19, further comprising:

means, recorded on the recording medium, for directing the processor, responsive to the predetermined condition being achieved, to transmit a message that the condition has been reached; and means, recorded on the recording medium, for directing the processor to terminate the step of exchanging responsive to transmission or receipt of a message that the condition has been reached.

* * * * *